United States Patent Office 3,540,859

Patented Nov. 17, 1970

3,540,859

METAL CHALCOGENIDES AND INTERMEDIATES FOR THEIR PREPARATION

Robert C. Taylor, Metuchen, and John B. Conn, Westfield, N.J., assignors to Merck & Co., Inc., Rahway, N.J., a corporation of New Jersey No Drawing. Division of application Ser. No. 76,139, Dec. 16, 1960. Continuation of application Ser. No. 578,887, Sept. 12, 1966, now Patent No. 3,390,090. This application Sept. 9, 1966, Ser. No. 635,274

Int. Cl. C01g 9/00, 11/00; H01i 3/00

U.S. Cl. 23—315 14 Claims

ABSTRACT OF THE DISCLOSURE

This invention relates to the production of metallic selenides and tellurides by first reducing elemental selenium or tellurium by the use of hypophosphite ions, and subsequently reacting the selenium or tellurium anions thus formed with cadmium, zinc, antimony or arsenic cations to form the selenides or telluride of cadmium, zinc, antimony or arsenic.

CROSS REFERENCE TO RELATED APPLICATIONS

This is a division of application Ser. No. 76,139 filed Dec. 16, 1960, now abandoned. A continuation of that application was application Ser. No. 578,887 filed Sept. 12, 1966, and this latter application matured into U.S. Pat. 3,390,090. The claims in that patent are directed to the method inventions involved in the original disclosure. The claims in this application are directed to the product inventions involved in that same disclosure.

BACKGROUND OF THE INVENTION

This invention relates generally to a method of preparing metallic selenides and tellurides. More particularly it is concerned with a process for making air stable metallic selenides and tellurides by hypophosphite reduction of selenium and tellurium and subsequent metathesis with metathetical agents of cadmium, zinc, antimony and arsenic.

The selenides and tellurides of zinc, arsenic, cadmium and antimony are semiconductors of importance in the electronics industry. For instance, the selenides and tellurides of zinc and cadmium, when suitably activated, have photoluminescent and photoconducting properties. After activation with a small amount of copper, zinc selenide luminesces red under cathode-ray bombardment, and cadmium selenide becomes a broad spectrum photoconductor having particular sensitivity at the red end of the spectrum. Such compounds are useful in the so-called "magic eye" devices and in some color television systems. Selenides and tellurides of antimony and arsenic are likewise semi-conductors of value in the electronic field.

As electronic chemicals, it is of utmost importance that these metal selenides and tellurides be ultra-pure, that is substantially free of metals of groups in the Periodic Table of elements other than those used as activators. Freedom from group VII metals, such as iron, cobalt and nickel, is particularly critical since even a few parts per million of such contaminants seriously interfere with the semi-conducting properties. In their ultra-pure state, the metal selenides and tellurides have very high resistivities and are of little use in semi-conducting applications.

The useful electronic properties appear when the balance of electrical charges in the ultra-pure materials is disturbed by the presence of imperfections. These may be vacancies caused by a slight compositional imbalance or by the incorporation of certain types of foreign atoms (activators) into the selenide or telluride. For instance, copper and halide ions are common activators for zinc and cadmium selenides and tallurides, while halide ions are suitable activators for selenides and tellurides of arsenic and antimony. The amount of activator must be rigorously controlled and is ordinarily accomplished today by first obtaining the selenide or tellurides in the highly pure state and then incorporating a measured amount of the desired activator. This step of introducing the desired "impurity" is referred to as "activating" or "doping." The amount of activator may vary from about 0.001 to about 0.1 mole percent of the final product, 0.01 mole percent being satisfactory in most cases.

One method known in the art of reducing selenium and tellurium comprises reacting elemental selenium and tellurium with sodium hydrosulfite in a 10% sodium hydroxide solution. This method suffers a disadvantage in that large quantities of insoluble sulfite salts are precipitated from solution. Such a system requires fairly elaborate filtration and washing procedures carried out in the absence of oxygen.

SUMMARY OF THE INVENTION

Accordingly, it is an object of this invention to provide a process for reducing selenium and tellurium without the formation of undersirable by-products.

It is another object of this invention to provide air-stable metallic selenides and tellurides suitable for use in the electronic industry by a process of reduction and metathesis.

It is another object of this invention to provide intermediates from which air-stable metallic selenides and tellurides may be prepared.

Another object is a process by which metallic selenides and tellurides may be readily activated or doped during their synthesis.

In general, the process of the present invention comprises reducing elemental selenium and tellurium either separately or together with hypophosphite ion in a heated alkaline medium under an inert atmosphere; and metathesizing the reduced solution with suitable metathetical agents of cadmium, zinc, antimony or arsenic.

The reduction is illustrated by Equation 1:

$$(1)\qquad X+H_2PO_2^-+3OH^-\rightarrow X^=+HPO_3^=+2H_2O$$

wherein X is tellurium or selenium or a mixture of both.

The reduced solution containing the tellurium and/or selenium ion in Equation 1 may then be metathesized with a salt of the desired metal and in the presence of a suitable activator to effect the conversion to the desired activated metal selenide or telluride.

In particular, the hypophosphite reduction as represented in Equation 1, is carried out at a temperature between 30° C. and 90° C. under an atmosphere of nitrogen. Preferably the reaction is carried out between 60° C. and 80° C. The hypophosphite reducing agent, conveniently provided as the salt of an alkali metal, is added to the heated suspension of tellurium or selenium in an amount substantially in excess of that required by stoichiometry. Preferably the reducing agent is present in the range of 25% to 50% excess, with optimum results being obtained when $KH_2PO_2\cdot H_2O$ is used as the source of hypophosphite ion in the ratio of approximately 1.5 moles per atom of selenium or tellurium. The hydroxyl ion is preferably supplied as 45% KOH technical grade. Although it is not always necessary, it is preferable to include a small amount of activated charcoal in the suspension prior to the reduction to adsorb metallic impurities present in the tellurium or selenium.

The selection of a suitable metathetical salt to be reacted with the appropriate reduced solution is governed by (a) the presence of a suitable metal atom in the salt (b) stability and solubility in alkaline media (c) ease of purification (d) ability to release the final product in a readibly filterable and air-stable form.

In general, simple metal salts are not as suitable for use as the metathesizing agents in that a finely divided precipitate is formed. In accordance with the present invention it has been found that zinc and cadmium are preferably introduced as the ammonia, ethanolamine, ethylenediamine and cyanide complexes. Optimum results in the final product are obtained when zinc is provided as the ethylenediamine or ammonia complexes, and cadmium is provided as the ethylenediamine or cyanide complexes. It is thought that these complexes act as solubilizing agents which promote the growth of large, air-stable crystallites during aging after precipitation is complete.

Arsenic is preferably introduced into the metathesis as the trioxide while antimony is provided by antimony potassium tartrate.

The metathesis is generally initiated by adding the metathetical salt to the appropriate reduced solution over a period of 25 to 60 min. The entire reaction is carried out with agitation under an inert atmosphere and at slightly elevated temperatures. It is preferable to maintain the mixture at between 60° C. to 80° C. Upon complete addition of the metathetical agent, the reaction mixture is digested for a period of from 2 to 6 hours. It is preferable to carbonate the reaction mixture prior to digestion to lower somewhat the pH of the solution. This procedure facilitates the precipitation of the solid product and is particularly advantageous in the preparation of the selenide and telluride of arsenic. The resulting solid product is then filtered, washed and dried in accordance with well known techniques.

During the initial stages of the metathesis vivid changes of color are observed in the reduced solution. It has been found that these changes in color are attributable to the formation of structurally complex intermediates of the metal with selenium and tellurium. These intermediates when isolated are found to vary in structure depending on the metathetical agents used. For example, the intermediates obtained when complexes of zinc and cadmium are used as the metathetical agents may be termed salts of a heteropolyacid. In contrast, the intermediates formed when compounds of arsenic and antimony are used conform to the complex ions $AsX_3^{\equiv}$ and $SbX_3^{\equiv}$ where X is tellurium or selenium.

In accordance with the process of the present invention, the intermediates formed during the metathesis are preferably converted into the final product in situ by the addition of excess metathetical salt. It will be appreciated, however, that the intermediates may be isolated and subsequently converted to the corresponding metallic derivative.

It was surprising to find that in addition to reducing selenium or tellurium independently, combinations of the two in predetermined ratios may be reduced and subsequently reacted with suitable metathetical agents to produce novel ternary systems of zinc telluride-selenide and cadmium zinc selenide as is described in the examples appearing hereinafter.

It will be realized by those skilled in the art that the process of the present invention may be used for making tellurides and selenides of any desired degree of purity. However, the method is particularly advantageous and useful for making ultra-pure selenides and tellurides for use in the electronics industry. To do this, the tellurium, selenium and metathetical salts used as starting materials should be sufficiently pure to preclude any of the contaminants present therein from carrying through to the final product, and care is taken to employ solvents, reagents, and equipment which do not introduce undesired impurities.

Another aspect of the present invention lies in the activation of the intrinsic metal selenides and tellurides during their preparation. This is accomplished by adding a small amount of a salt of the activator to the metathetical solution before it is added to the reduced solution. Copper and halide ion are the usual activators for the selenides and tellurides and may be added in the form of a water soluble salt to the metal solution. During the metathesis the activator becomes diffused through the selenide or telluride crystals. Only small quantities, of the order of 0.001 to 0.1 mole percent and preferably about 0.01 mole percent of activator are employed, the exact amount depending upon the intended use of the end product.

DESCRIPTION OF THE PREFERRED EMBODIMENTS

The following examples are given for purposes of illustration and not by way of limitation:

EXAMPLE 1

Preparation of the reduced solution

To a stirred suspension of 79 g. (1 gram-atom) selenium powder and 1 gr. activated charcoal in 800 ml. technical 45% potassium hydroxide liquor under nitrogen atmosphere and heated to 60–80° C., there is added a solution of 160 g. (1.5 moles) potassium hypophosphite in 200 ml. water, as rapidly as foaming permits. The color of the caustic suspension fades from inky red to amber.

Similarly the above procedure is followed using 128 gms. (1 g. atom) of powdered tellurium in place of the selenium to obtain a reduced solution of tellurium ion.

EXAMPLE 2

Preparation of the tripotassium oxyhexaselenotetracadmate intermediate

The reduced mixture of Example 1 containing 1 gm. atom selenium is pumped through a line-filter into a conversion flask, while maintaining nitrogen atmosphere, and there heated to between 60° C. and 80° C. and treated under stirring with a solution of 64 g. (0.5 mole) cadmium oxide and 98 g. (2 moles) sodium cyanide in 400 ml. water, which is added dropwise. The amber color of the selenide solution fades to greenish yellow during the early stages of the addition, and subsequently an orange precipitate appears in quantity. The reaction mixture is digested for 2 hr. after completion of the metathesis and cooled to room temperature.

The suspension is then filtered through a sinter-glass funnel, washed with 25% KOH solution, methanol, and ether, and placed in a vacuum desiccator over calcium chloride. The orange solid weighing 78.5 g. is amorphous by X-ray diffraction.

Cal. for $K_3H_3(Cd.OSe_6)\cdot 5H_2O$, For. Wt. 1149.80 (percent): K, 10.2; Cd, 39.1; Se, 41.2. Found (percent): K, 9.8; Cd, 39.1; Se, 41.2.

The corresponding hexatellurotetracadmate is obtained when a reduced tellurium solution as obtained in Example 1 is substituted for the reduced selenium solution and then metathesized in the manner indicated above.

Similarly, the analogous hexatelluro- and hexaselenotetrazincates are prepared by reacting a zinc metathetical agent of 0.5 mole of ZnO and 0.5 mole of ammonium carbonate dissolved in 250 ml. of 14% ammonia water with the appropriate reduced solution containing 1 gm.-atom of tellurium or selenium.

EXAMPLE 3

Preparation of tetrapotassium oxyheptaselenotetracadmate

A reduced solution containing 3 gm. atoms of selenium prepared as in Example 1 is metathesized in the manner of Example 2 with a solution of 2 moles cadmium oxide and 4 moles sodium cyanide in 800 ml. water. Heat is maintained for 90 minutes after the reaction is complete after which the mixture is allowed to cool to room temperature. The mixture is filtered and the orange amorphous solid washed with 25% KOH, methanol and ether and dried in a desiccator.

Cal. for $K.H.(Cd.OSe_7)\cdot 15H_2O$ For. Wt. 1449.05 (percent): K, 10.8; Cd, 31.0; Se, 38.2. Found (percent): K, 10.6; Cd, 31.4; Se, 38.2.

The corresponding heptatellurotetracadmate is obtained when a reduced solution of tellurium as obtained in Example 1 is substituted for the reduced selenium solution and then metathesized in the manner indicated above.

Similarly the analogous heptatelluro- and heptaselenotetrazincates are prepared by reacting a metathetical agent of 2 moles ZnO and 2 moles ammonium carbonate dissolved in 500 ml. of 14% ammonia water with the appropriate reduced solution containing 3 gm.-atoms of tellurium or selenium.

EXAMPLE 4

Cadmium selenide

A solution of 1 mole $Na_2Cd(CN)_4$ is prepared by dissolving 196 g. (4 moles) NaCN and 128 g. (1 mole) CdO in 800 ml. water. This is added dropwise over 30 min. to a heated and stirred reduction mixture containing 79 g. (1 atom) selenium. The orange intermediate in this case gradually darkens to chocolate brown during the digestion period. The reaction is completed by carbonation; after filtration, the solid is washed with 50% acetic acid, deionized water, and methanol, and dried at 100° C. under carbon dioxide. The solid as obtained is found to be the metastable cubic form of CdSe.

EXAMPLE 5

Zinc selenide

A metathetical salt of 500 ml. of ammoniacal zinc carbonate containing 1 mole of ZnO is added to a hypophosphite reduced selenium solution in the manner described in Example 4. The resulting zinc selenide precipitate is washed and dried in accordance with the procedure outlined therein.

EXAMPLE 6

Cadmium telluride

A mixture of 128 g. (1 g.-atom) technical tellurium powder and 1 g. activated charcoal is added to 800 ml. technical 45% KOH, and reduced by addition of a solution of 160 g. potassium hypophosphite as described in Example 1. The suspension of tellurium changes to an inky purple solution, which bleaches at the end. This mixture is pumped through a line-filter into a conversion flask, where it is metathesized at 60° C.–80° C. with one mole of trisethylenediamino-cadmium acetate prepared by dissolving 128 g. (1 mole) cadmium oxide in 120 g. (2 moles) glacial acetic acid and water, then adding 180 g. (3 moles) ethylenediamine. The final volume of the acetate solution is 700 ml. and is added to the reduced solution over a period of 45 min. The orange complex intermediate darkens through brown to nearly black during the 2½ hr. digestion period. After carbonation in the usual manner, the solid CdTe is filtered, washed with 10% ethylenediamine (to dissolve any cadmium phosphite), 50% acetic acid, deionized water and methanol, and dried under carbon dioxide.

EXAMPLE 7

Zinc telluride

The zinc metathetical salt described in Example 5 is added to the tellurium reduced solution of Example 6 in accordance with the procedure set forth therein. The solid zinc telluride is then washed and dried in the manner described in Example 6.

EXAMPLE 8

Zinc selenide-telluride solid solutions; $ZnSe_{3/4}Te_{1/4}$; $ZnSe_{1/2}Te_{1/2}$; $ZnSe_{1/4}Te_{3/4}$ A mixture of 60 g. (0.75 g.-atom) selenium and 32 g. (0.25 g.-atom) tellurium is reduced in the manner of Example 1. Metathesis of the reduction mixture is done with 500 ml. ammoniacal zinc carbonate, containing 1 mole ZnO, over a period of 30 min. After digestion of 5½ hr., the orange suspension is carbonated, filtered, and the filter cake washed with 1:10 ammonia water, 50% acetic acid, deionized water, and methanol. Drying is done under carbon dioxide. Ignition under hydrogen gives fiery orange solids; the X-ray diffraction pattern is that of a homogeneous face-centered cubic solid solution, and gives $a_0$=5.768 A.

The above procedure is repeated except that a mixture of 39.5 gm. (0.5 g. atom) Se and 64 gm. (0.5 g. atom) Te is reduced and metathesized to yield a scarlet colored solid solution of $ZnSe_{1/2}Te_{1/2}$. Unit cell constant $a_0$=5.882 A. by X-ray diffraction.

Similarly, the solid solution $ZnSe_{1/4}Te_{3/4}$, bright rose in color, is obtained by metathesizing a reduced solution of 20 gm. (0.25 g. atom) Se and 96 gms. (0.75 g. atom) Te according the above detailed procedure. X-ray diffraction pattern gives $a_0$=5.986 A.

EXAMPLE 9

Cadmium zinc selenide: The rhombohedral phase $CdZn_2Se_3$

A cadmium metathetical salt is prepared as follows: to a solution of 600 g. ammonium carbonate in 2500 ml. 14% ammonia water there is added 700 g. technical cadmium oxide. The suspension is stirred until only a small gray residue is left; then 1 g. activated charcoal is introduced, and the mixture is filtered.

Reduction of 79 g. (1 g.-atom) selenium is carried out as in Example 1. The solution is allowed to cool nearly to room temperature, then transferred to a conversion flask. To the stirred, but unheated mixture is added dropwise, ammoniacal zinc carbonate solution prepared as in Example 2 and containing ⅔ mole $Zn^{++}$. A white complex intermediate separates out. After this stage is completed, ammoniacal cadmium carbonate solution described above and equivalent to ⅓ mole $Cd^{++}$ is introduced dropwise. The color of the suspension passes through yellow to orange during this process. The mixture is stirred for 30 min. at room temperature, then heated for 2 hr. at 60–80° C.; the suspension turns bronze-orange. The precipitate is filtered, washed and dried according to the procedure of Example 8.

The X-ray diffraction data is found to fit a rhombohedral unit cell having constants $a_0$=9.78 A. $\alpha$=78°, and containing six molecules of $CdZn_2Se_3$.

EXAMPLE 10

The cubic solid solution phase of cadmium zinc selenide

The procedure is that of Example 9, save that the tetraamine zinc and cadmium complexes are added in mixture. The bright orange product weighing 153 g. (quantitative) is found to be a homogeneous solid solution isostructural with cubic zinc selenide: $a_0$=5.783 A.

EXAMPLE 11

The hexagonal solid solution phase of cadmium zinc selenide

Metathesis of reduction mixture of 79 g. (1 g.-atom) selenium is done by adding ⅔ mole $Na_2Zn(CN)_4$ solution, followed by ⅓ mole $Na_2Cd(CN)_4$. These cyanides are prepared by following the procedure outlined in Example 4 substituting ZnO for CdO where appropriate. The red-orange product weighing 16 g. becomes brilliant scarlet when ignited under hydrogen. The X-ray diffraction pattern shows that the material is a homogeneous solid solution isostructural with cadmium selenide: $a_0$=4.166 A.; $c_0$=6.821 A.

Precisely the same product is obtained when the zinc and cadmium cyanides are added together as a mixture.

EXAMPLE 12

Arsenic telluride

To a reduced solution containing 128 gms. (1 g. atom) Te, prepared as in Example 1, there is added over a period of 45 minutes a solution of 65.6 gm. (⅓ g. mole) $As_2O_3$ dissolved in 200 ml. 25% KOH. A reddish-brown color is observed due to the formation of $AsTe_3^{\equiv}$ complex. The solution is then carbonated to precipitate $As_2Te_3$. After filtration the solid is washed with 25% KOH, methanol and ether, and dried at 100° C. under carbon dioxide. X-ray patterns on the gray solid match those reported for monoclinic $As_2Te_3$.

The above procedure is followed to obtain arsenic selenide by metathesizing a reduced selenium solution instead of the reduced tellurium solution.

EXAMPLE 13

Antimony telluride

An antimony metathetical salt, prepared by dissolving 222.6 gm. (⅔ g. mole) antimony potassium tartrate in 350 ml. of 25% KOH, is added over a period of 45 minutes to a heated reduced solution containing 1 g. atom tellurium. During the early stages of the addition an orange-brown color appears due to the formation of the $SbTe_3^{\equiv}$ complex. Subsequently, the grayish precipitate $Sb_2Te_3$ forms and is separated by filtration. The solid is then washed and dried according to the procedure outlined in Example 9. X-ray patterns on the solid match those reported for rhombohedral $Sb_2Te_3$ Antimony selenide is prepared by following the above procedure substituting a reduced selenium solution for the reduced tellurium solution.

When the procedures of the foregoing examples are repeated using 0.01 mole percent cuprous chloride dissolved in the reduced solutions, the final products obtained by metathesis contain activator amounts of cuprous and chloride ions.

Various changes and modifications may be made in carrying out the present invention without departing from the spirit and scope thereof. Any such departure which conforms to the present invention is intended to be within the scope of the appended claims.

What is claimed is:

1. The compound $X_3H_3(Cd_4OSe_6)\cdot5H_2O$ wherein X is an alkali metal.

2. The compound $X_3H_3(Cd_4OTe_6)\cdot5H_2O$ wherein X is an alkali metal.

3. The compound $X_3H_3(Zn_4OSe_6)\cdot5H_2O$ wherein X is an alkali metal.

4. The compound $X_3H_3(Zn_4OTe_6)\cdot5H_2O$ wherein X is an alkali metal.

5. The compound $X_4H_4(Cd_4OSe_7)\cdot15H_2O$ wherein X is an alkali metal.

6. The compound $X_4H_4(Cd_4OTe_7)\cdot15H_2O$ wherein X is an alkali metal.

7. The compound $X_4H_4(Zn_4OSe_7)\cdot15H_2O$ wherein X is an alkali metal.

8. The compound $X_4H_4(Zn_4Ote_7)\cdot15H_2O$ wherein X is an alkali metal.

9. The solid solution $ZnSe_{3/4}Te_{1/4}$ having a face centered cubic unit cell with $a_0$=5.768 A.

10. The solid solution $ZnSe_{1/2}Te_{1/2}$ having a face centered cubic unit cell with $a_0$=5.882 A.

11. The solid solution $ZnSe_{1/4}Te_{3/4}$ having a face centered cubic unit cell with $a_0$=5.986 A.

12. The compound $CdZn_2Se_3$ having a rhombohedral unit cell containing six molecules of $CdZn_2Se_3$ with $a_0$=9.78 A., $\alpha$=78°.

13. The compound $CdZn_2Se_3$ having a cubic unit cell with $a_0$=5.783 A.

14. The compound $CdZn_2Se_3$ having a hexagonal unit cell with $a_0$=4.166 A. and $c_0$=6.821 A.

References Cited

UNITED STATES PATENTS

| | | | |
|---|---|---|---|
| 1,908,188 | 5/1933 | Ruben | 23—135 |
| 2,804,378 | 8/1957 | Upton | 23—50 |
| 3,023,079 | 2/1962 | Kulifay | 23—50 |
| 3,065,048 | 11/1962 | Conn et al. | 23—50 |
| 3,390,090 | 6/1968 | Taylor et al. | 252—62.3 |

OTHER REFERENCES

Mellor: A Comprehensive Treatise on Inorganic and Theoretical Chemistry, vol. 4 (1923), pp. 586–589.

OSCAR R. VERTIZ, Primary Examiner

H. S. MILLER, Assistant Examiner

U.S. Cl. X.R.

23—135; 252—62.3